United States Patent
Seong et al.

(10) Patent No.: US 11,225,556 B2
(45) Date of Patent: Jan. 18, 2022

(54) METHOD FOR PRODUCING SUPER ABSORBENT POLYMER

(71) Applicant: LG Chem, Ltd., Seoul (KR)

(72) Inventors: Bo Hyun Seong, Daejeon (KR); Dae Woo Nam, Daejeon (KR); Jun Kyu Kim, Daejeon (KR); Su Jin Kim, Daejeon (KR); Seon Jung Jung, Daejeon (KR); Ji Yoon Jeong, Daejeon (KR); Tae Hwan Jang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/094,043

(22) PCT Filed: Dec. 28, 2016

(86) PCT No.: PCT/KR2016/015417
§ 371 (c)(1),
(2) Date: Oct. 16, 2018

(87) PCT Pub. No.: WO2018/117318
PCT Pub. Date: Jun. 28, 2018

(65) Prior Publication Data
US 2019/0135992 A1    May 9, 2019

(30) Foreign Application Priority Data

Dec. 19, 2016 (KR) .................. 10-2016-0173803

(51) Int. Cl.
| | |
|---|---|
| *C08J 3/24* | (2006.01) |
| *C08J 3/075* | (2006.01) |
| *C08J 3/12* | (2006.01) |
| *C08L 33/06* | (2006.01) |
| *C08F 2/38* | (2006.01) |
| *C08K 3/30* | (2006.01) |
| *C08K 3/011* | (2018.01) |
| *C08L 63/00* | (2006.01) |

(52) U.S. Cl.
CPC ............... *C08J 3/245* (2013.01); *C08F 2/38* (2013.01); *C08J 3/075* (2013.01); *C08J 3/12* (2013.01); *C08J 3/24* (2013.01); *C08L 33/06* (2013.01); *C08J 2333/02* (2013.01); *C08K 3/011* (2018.01); *C08K 2003/3081* (2013.01); *C08L 63/00* (2013.01)

(58) Field of Classification Search
CPC ...... C08F 2/38; C08J 3/075; C08J 3/12; C08J 3/24; C08J 3/245; C08L 33/06
USPC .................................................... 523/400
See application file for complete search history.

(56) References Cited

U.S. PATENT DOCUMENTS

| | | | |
|---|---|---|---|
| 5,453,323 A | 9/1995 | Chambers et al. | |
| 2004/0176557 A1 | 9/2004 | Mertens et al. | |
| 2005/0234413 A1* | 10/2005 | Funk | C08F 220/04 604/358 |
| 2006/0029782 A1 | 2/2006 | Harren et al. | |
| 2007/0203304 A1 | 8/2007 | Mitchell | |
| 2008/0081848 A1 | 4/2008 | Shih et al. | |
| 2009/0023848 A1 | 1/2009 | Ahmed et al. | |
| 2009/0208748 A1 | 8/2009 | Torii et al. | |
| 2009/0298963 A1 | 12/2009 | Matsumoto et al. | |
| 2012/0232176 A1 | 9/2012 | Lopez Villanueva et al. | |
| 2014/0058048 A1 | 2/2014 | Won et al. | |
| 2014/0371400 A1 | 12/2014 | Tachi et al. | |
| 2015/0011388 A1* | 1/2015 | Matsumoto | A61L 15/60 502/402 |
| 2015/0087742 A1* | 3/2015 | Won | C08J 3/24 522/181 |
| 2015/0099624 A1 | 4/2015 | Lee et al. | |
| 2015/0315321 A1* | 11/2015 | Won | C08J 3/245 525/328.8 |
| 2016/0208022 A1 | 7/2016 | Kim et al. | |

FOREIGN PATENT DOCUMENTS

| | | |
|---|---|---|
| CN | 1760260 A | 4/2006 |
| CN | 104136505 A | 11/2014 |
| CN | 105916902 A | 8/2016 |
| EP | 2518092 A1 | 10/2012 |
| EP | 2669318 A1 | 12/2013 |
| EP | 3075760 A1 | 10/2016 |
| EP | 3085439 A1 | 10/2016 |
| EP | 3375809 A1 | 9/2018 |
| JP | 2007530754 A | 11/2007 |
| JP | 2013511610 A | 4/2013 |
| JP | 2015221910 A | 12/2015 |
| KR | 20070092707 A | 9/2007 |
| KR | 20100040858 A | 4/2010 |
| KR | 101680829 B1 | 11/2016 |
| WO | 9527739 A1 | 10/1995 |

(Continued)

OTHER PUBLICATIONS

Extended Search Report including Written Opinion for Application No. EP16924621.2 dated Feb. 15, 2019.
International Search Report for PCT/KR2016/015417, dated Sep. 12, 2017.
Buchholz et al., "Modern Superabsorbent Polymer Technology", John Wiley & Sons, Inc., 1998, 50 pages.
Third Party Observation for Application No. PCT/KR2016/015417 dated Apr. 12, 2019, 15 pages.
Chinese Search Report for Application No. 201680085124.1 dated Aug. 5, 2020, 1 page.

*Primary Examiner* — David T Karst

(74) *Attorney, Agent, or Firm* — Lerner, David, Littenberg, Krumholz & Mentlik, LLP

(57) ABSTRACT

A super absorbent polymer produced by the preparation method of the super absorbent polymer according to the present invention has excellent dryness while maintaining excellent absorption performance, and thus is preferably used for hygienic materials such as diapers and can exhibit excellent performance.

6 Claims, No Drawings

(56) References Cited

FOREIGN PATENT DOCUMENTS

| WO | 2005063313 A1 | 7/2005 | | |
|---|---|---|---|---|
| WO | 2013142060 A1 | 9/2013 | | |
| WO | WO-2013162255 A2 * | 10/2013 | ............ | B01J 20/267 |
| WO | 2014162843 A1 | 10/2014 | | |
| WO | WO-2015046992 A1 * | 4/2015 | ................ | C08F 2/10 |

* cited by examiner

METHOD FOR PRODUCING SUPER ABSORBENT POLYMER

CROSS-REFERENCE TO RELATED APPLICATION(S)

The present application is a national phase entry under 35 U.S.C. § 371 of International Application No. PCT/KR2016/015417, filed on Dec. 28, 2016, which claims priority to Korean Patent Application No. 10-2016-0173803, filed on Dec. 19, 2016, the disclosures of which are incorporated herein by reference.

TECHNICAL FIELD

The present invention relates to a method for producing a super absorbent polymer having excellent dryness while maintaining excellent absorption performance.

BACKGROUND ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, it is necessary for the super absorbent polymer to basically exhibit high absorption performance and absorption rate.

For this purpose, the conventional super absorbent polymer uses a method of lowering the degree of internal crosslinking and increasing the degree of surface crosslinking. According to this method, however, the absorption rate may be increased, but after the super absorbent polymer is swollen by the absorbed liquid, the liquid is present on the surface of the super absorbent polymer, which causes a decrease in wearing feeling, a skin rash or the like.

As described above, the extent to which no liquid is present on the surface after the super absorbent polymer absorbs the liquid is referred to as "dryness". Therefore, there is a need to develop a super absorbent polymer having excellent dryness, without impairing the absorption performance and absorption rate of the super absorbent polymer.

DETAILED DESCRIPTION OF THE INVENTION

Technical Problem

It is an object of the present invention to provide a method for producing a super absorbent polymer having excellent dryness while maintaining excellent absorption performance, and a super absorbent polymer produced thereby.

Technical Solution

In order to achieve the above objects, the present invention provides a method for producing a super absorbent polymer as follows:

the method for producing a super absorbent polymer comprising the steps of:

crosslinking a water-soluble ethylenically unsaturated monomer having at least partially neutralized acidic groups in the presence of an internal crosslinking agent and a thermal polymerization initiator (step 1);

drying, pulverizing and classifying the hydrogel polymer to form a base polymer power (step 2); and heat-treating and surface-crosslinking the base polymer powder in the presence of a surface crosslinking solution to form a super absorbent polymer particle (step 3), wherein the thermal polymerization initiator is used in an amount of 0.04 to 0.22 parts by weight based on 100 parts by weight of the ethylenically unsaturated monomer.

The method for producing a super absorbent polymer according to the present invention is intended to produce a super absorbent polymer having excellent dryness while maintaining excellent absorption performance, and is characterized by adjusting the content of the thermal polymerization initiator especially in the production of the hydrogel polymer. The characteristics of the base polymer powder prepared in step 2 can be controlled according to the content of the thermal polymerization initiator. This surface crosslinking makes it possible to produce a super absorbent polymer having excellent dryness while having excellent absorption rate.

Hereinafter, embodiments of the present invention will be described in more detail.

(Step 1)

Step 1 is a step of forming a hydrogel polymer which is a step of crosslinking a monomer composition comprising an internal crosslinking agent, a thermal polymerization initiator, and a water-soluble ethylenically unsaturated monomer having at least partially neutralized acidic groups.

The water-soluble ethylenically unsaturated monomer constituting the first cross-linked polymer may be any monomer commonly used in the production of a super absorbent polymer. As a non-limiting example, the water-soluble ethylenically unsaturated monomer may be a compound represented by the following Chemical Formula 1:

$$R_1-COOM^1 \qquad \text{[Chemical Formula 1]}$$

in Chemical Formula 1, $R_1$ is an alkyl group having 2 to 5 carbon atoms containing an unsaturated bond, and M is a hydrogen atom, a monovalent or divalent metal, an ammonium group or an organic amine salt.

Preferably, the above-described monomer may be at least one selected from the group consisting of acrylic acid, methacrylic acid, and a monovalent metal salt, a divalent metal salt, an ammonium salt, and an organic amine salt thereof. When acrylic acid or a salt thereof is used as the water-soluble ethylenically unsaturated monomer, it is advantageous in that a super absorbent polymer having improved absorption property can be obtained. In addition, as the monomer, maleic anhydride, fumaric acid, crotonic acid, itaconic acid, 2-acryloylethanesulfonic acid, 2-methacryloylethanesulfonic acid, 2-(meth)acryloylpropane sulfonic acid, or 2-(meth)acrylamido-2-methylpropane sulfonic acid, (meth)acrylamide, N-substituted (meth)acrylate, 2-hydroxyethyl(meth)acrylate, 2-hydroxypropyl(meth)acrylate, methoxypolyethylene glycol(meth)acrylate, polyethylene glycol (meth)acrylate, (N,N)-dimethylaminoethyl(meth)acrylate, (N,N)-dimethylaminopropyl(meth)acrylamide, and the like may be used.

Here, the water-soluble ethylenically unsaturated monomers may have an acidic group, wherein at least a part of the acidic group may be neutralized. Preferably, the monomers may be those partially neutralized with an alkali substance such as sodium hydroxide, potassium hydroxide, ammonium hydroxide, or the like.

In this case, a degree of neutralization of the monomer may be 40 to 95 mol %, or 40 to 80 mol %, or 45 to 75 mol %. The range of the degree of neutralization may vary depending on the final physical properties. However, an excessively high degree of neutralization causes the neutralized monomers to be precipitated, and thus polymerization may not readily occur, whereas an excessively low degree of neutralization not only greatly deteriorates the absorbency of the polymer, but also endows the polymer with hard-to-handle properties, such as those of an elastic rubber.

Further, the concentration of the water-soluble ethylenically unsaturated monomer in the monomer composition may be appropriately adjusted in consideration of the polymerization time, the reaction conditions and the like, and it may be preferably 20 to 90% by weight, or 40 to 65% by weight. These concentration ranges may be advantageous for adjusting the pulverization efficiency during pulverization of the polymer described below, without needing to remove unreacted monomers after polymerization by using the phenomenon of gel effect occurring in the polymerization reaction of the highly concentrated aqueous solution. However, when the concentration of the monomer is excessively low, the yield of the super absorbent polymer can be lowered. Conversely, when the concentration of the monomer is excessively high, it may arise problems in the processes, for example, a part of the monomer may be precipitated, or the pulverization efficiency may be lowered during pulverization of the polymerized hydrogel polymer, etc., and the physical properties of the super absorbent polymer may be deteriorated.

Meanwhile, as the thermal polymerization initiator, one or more selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), and the like; and examples of the azo-based initiator include 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) or the like.

In particular, in the present invention, the thermal polymerization initiator is used in an amount of 0.04 to 0.22 parts by weight based on 100 parts by weight of the ethylenically unsaturated monomer. The amount of the thermal polymerization initiator used affects the physical properties of the base polymer prepared in step 2, and particularly affects the extractable content of the base polymer. If the extractable content is increased, the physical properties of the super absorbent polymer produced in step 3 are deteriorated, and in particular, the 6-hour dryness is deteriorated. Thus, in the present invention, a super absorbent polymer having excellent dryness while maintaining excellent absorption performance is produced by using the above-mentioned content of the thermal polymerization initiator. When the amount of the thermal polymerization initiator used exceeds 0.22 parts by weight, the 6-hour dryness of the finally produced super absorbent polymer is lowered. Further, when the amount of the thermal polymerization initiator used is less than 0.04 parts by weight, the efficiency of the hydrogel polymerization decreases and various physical properties of the finally produced super absorbent polymer decreases. Preferably, the thermal polymerization initiator is used in an amount of 0.05 to 0.20 parts by weight based on 100 parts by weight of the ethylenically unsaturated monomer.

Further, step 1 can be carried out in the presence of an internal crosslinking agent. As the internal crosslinking agent, any compound can be used without limitation as long as it enables introduction of a crosslink bond upon polymerization of the water-soluble ethylenically unsaturated monomer. Non-limiting examples of the internal crosslinking agent may include multifunctional crosslinking agents, such as N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto. Preferably, two kinds of polyethylene glycol diacrylates having different molecular weights are used Such internal crosslinking agent may be added at a concentration of 0.001 to 1% by weight, based on the monomer composition. That is, if the concentration of the internal crosslinking agent is too low, the absorption rate of the polymer is lowered and the gel strength may become weak, which is undesirable. Conversely, if the concentration of the internal crosslinking agent is too high, the absorption capacity of the polymer is lowered and thereby is not preferred for an absorbent.

Further, step 1 can be carried out in the presence of a surfactant. The surfactant serves to uniformly distribute bubbles in the entire area of the polymer simultaneously while maintaining the shape of bubbles formed during polymerization, which serves to increase the surface area of the polymer. Preferably, as the surfactant, a cationic surfactant, an anionic surfactant, or a nonionic surfactant can be used. As an example, as the anionic surfactant, a compound represented by the following Chemical Formula 2 can be used, and more preferably, sodium dodecyl sulfate can be used.

$$R-SO_3Na \qquad \text{[Chemical Formula 2]}$$

in Chemical Formula 2,

R is an alkyl having 8 to 16 carbon atoms.

Further, the surfactant is preferably used in an amount of 0.001 to 1% by weight based on the weight of the water-soluble ethylenically unsaturated monomer. When the amount of the surfactant used exceeds 1% by weight, no substantial improvement effect is obtained, and the content of the surfactant in the super absorbent polymer increases, which is not preferable.

Further, step 1 can be carried out in the presence of a foaming agent. The foaming agent acts to cause causing foaming during polymerization to produce pores in the hydrogel polymer, thereby increasing the surface area. As the foaming agent, an inorganic foaming agent or an organic foaming agent can be used. Examples of the inorganic foaming agent may include sodium bicarbonate, sodium carbonate, potassium bicarbonate, potassium carbonate, calcium bicarbonate, calcium carbonate, magnesium bicarbonate or magnesium carbonate. Further, examples of the organic foaming agent may include azodicarbonamide (ADCA), dinitroso pentamethylene tetramine (DPT), p,p'-oxybisbenzene sulfonylhydrazide (OBSH), and p-toluene-sulfonyl hydrazide (TSH).

Further, the foaming agent is preferably used in an amount of 0.01 to 1% by weight based on the weight of the water-soluble ethylenically unsaturated monomer. When the amount of the foaming agent used exceeds 1% by weight, the pores become too large, the gel strength of the super absorbent polymer lowers and the density becomes low, which may cause problems in distribution and storage.

In addition, the monomer composition may further comprise additives such as a thickener, a plasticizer, a preservation stabilizer, an antioxidant, etc., if necessary.

Such monomer composition may be prepared in the form of a solution in which raw materials such as the above-mentioned monomer are dissolved in a solvent. In this case, any usable solvent can be used without limitation in the constitution as long as it can dissolve the above-mentioned raw materials. Examples of the solvent may include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

Further, the formation of the hydrogel polymer through polymerization of the monomer composition may be performed by a general polymerization method. For example, the polymerization can be carried out in a reactor like a kneader equipped with agitating spindles. In this case, the monomer composition is injected into a reactor like a kneader equipped with the agitating spindles, and thermal polymerization can be performed by providing hot air thereto or heating the reactor, thereby obtaining the hydrogel polymer. At this time, the hydrogel polymer, which is discharged from the outlet of the reactor according to the type of agitating spindles equipped in the reactor, can be obtained as particles with a size of centimeters or millimeters. Specifically, the hydrogel polymer may be obtained in various forms according to the concentration of the monomer composition injected thereto, the injection speed, or the like, and the hydrogel polymer having a (weight average) particle diameter of 2 to 50 mm may be generally obtained.

Meanwhile, the hydrogel polymer obtained by the above-mentioned method may have a water content of 40 to 80% by weight. Meanwhile, the "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 180° C. and then the temperature may be maintained at 180° C., and the total drying time may be set to 20 minutes, including 5 minutes for the temperature rising step.

(Step 2)

Step 2 is a step of drying, pulverizing and classifying the hydrogel polymer prepared in step 1 to form a base polymer power, and the base polymer powder and the super absorbent polymer obtained therefrom are suitably prepared and provided so as to have a particle size of 150 to 850 μm. More specifically, at least 95% by weight of the base polymer powder and the super absorbent polymer obtained therefrom have a particle size of 150 to 850 μm, and fine powders having a particle size of less than 150 μm can be less than 3% by weight. As the particle size distribution of the base polymer powder and the super absorbent polymer is adjusted within the preferable range as described above, the super absorbent polymer finally produced can already exhibit the above-mentioned physical properties more satisfactorily.

Meanwhile, the method of proceeding the drying, grinding and classifying will be described in more detail below.

First, when drying the hydrogel polymer, a step of coarse pulverization may be further carried out before drying in order to increase the efficiency of the drying step, if necessary. A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarse pulverizing step may be performed so that the hydrogel polymer has a particle size of about 2 mm to about 10 mm. Pulverizing the hydrogel polymer into a particle size of less than 2 mm is technically not easy due to a high water content of the hydrogel polymer, and a phenomenon of agglomeration may occur between the pulverized particles. Meanwhile, if the hydrogel polymer is pulverized into a particle size of larger than 10 mm, the effect of increasing the efficiency in the subsequent drying step may be insignificant.

The hydrogel polymer coarsely pulverized as above or immediately after polymerization without the coarsely pulverizing step is subjected to a drying step. At this time, the drying temperature may be 50 to 250° C. When the drying temperature is less than 50° C., it is likely that the drying time becomes too long or the physical properties of the super absorbent polymer finally formed is deteriorated. When the drying temperature is higher than 250° C., only the surface of the polymer is excessively dried, and thus fine powder may be generated during the subsequent pulverization process and the physical properties of the super absorbent polymer finally formed may be deteriorated. More preferably, the drying may be performed at a temperature of 150 to 200° C., and more preferably at a temperature of 160 to 190° C. Meanwhile, the drying step may be carried out for 20 minutes to 15 hours, in consideration of the process efficiency, but is not limited thereto.

In the drying step, any drying method may be selected and used without limitation in the constitution if it is a method commonly used in the relevant art. Specifically, the drying step may be carried out by a method such as hot air supply, infrared irradiation, microwave irradiation or ultraviolet irradiation. When the drying step as above is finished, the water content of the polymer may be 0.05 to 10% by weight.

Next, a step of pulverizing the dried polymer obtained through such a drying step is carried out. The polymer powder obtained through the pulverizing step may have a particle diameter of 150 μm to 850 μm. Specific examples of a pulverizing device that can be used to pulverize into the above particle diameter may include a ball mill, a pin mill, a hammer mill, a screw mill, a roll mill, a disc mill, a jog mill or the like, but it is not limited to the above-described examples.

Further, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of 150 μm to 850 μm is classified and only the polymer powder having such a particle diameter is subjected to the surface crosslinking reaction described later and finally commercialized.

(Step 3)

Step 3 is a step of crosslinking the surface of the base polymer prepared in step 2, which is a step of hear-treating and surface-crosslinking the base polymer powder in the presence of a surface crosslinking solution to form a super absorbent polymer particle.

The surface crosslinking solution may comprise at least one surface crosslinking agent selected from the group consisting of a compound having two or more epoxy rings and a compound having two or more hydroxy groups.

Preferably, the surface crosslinking solution may comprise both a compound having two or more epoxy rings and a compound having two or more hydroxy groups. In this case, the surface crosslinking solution comprises a compound having two or more epoxy rings and a compound having two or more hydroxy groups in a weight ratio of 1:1.1 to 1:5.

Examples of the compound having two or more epoxy rings include one or more compounds selected from the group consisting of ethylene glycol diglycidyl ether, polyethylene glycol diglycidyl ether, glycerol polyglycidyl ether, propylene glycol diglycidyl ether, polypropylene glycol diglycidyl ether, 1,4-butanediol diglycidyl ether, 1,4-cyclohexanedimethanol diglycidyl ether, hexahydrophthalic anhydride diglycidyl ether, neopentyl glycol diglycidyl ether, bisphenol A diglycidyl ether, and N,N-diglycidylaniline. Preferably, ethylene glycol diglycidyl ether is used.

Examples of the compound having two or more hydroxy groups include one or more compounds selected from the group consisting of ethylene glycol, diethylene glycol, propylene glycol, triethylene glycol, tetraethylene glycol, propane diol, dipropylene glycol, polypropylene glycol, glycerin, polyglycerin, butane diol, heptane diol, hexane diol, trimethylol propane, pentaerythritol, and sorbitol. Preferably, propylene glycol is used.

At this time, the surface crosslinking agent is preferably used in an amount of 1 part by weight or less based on 100 parts by weight of the base polymer. Here, the amount of the surface crosslinking agent used refers to the total amount of the surface cross-linking agents when two or more of the surface crosslinking agents are used. When the amount of the surface crosslinking agent used is more than 1 part by weight, excessive surface crosslinking may proceed and various physical properties, particularly dryness, of the super absorbent polymer may be deteriorated. In addition, the surface crosslinking agent is preferably used in an amount of 0.01 parts by weight or more, 0.02 parts by weight or more, 0.03 parts by weight or more, 0.04 parts by weight or more, or 0.05 parts by weight or more based on 100 parts by weight of the base polymer.

Moreover, the surface crosslinking solution may further comprises at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate and N,N-dimethylacetamide. Preferably, water can be used. The solvent can be used in an amount of 0.5 to 10 parts by weight based on 100 parts by weight of the base polymer particle.

Furthermore, the surface crosslinking solution may further comprise aluminum sulfate. The aluminum sulfate may be contained in an amount of 0.02 to 0.3 parts by weight based on 100 parts by weight of the base polymer powder.

Further, the surface crosslinking solution may further comprise an inorganic filler. The inorganic filler may include silica, aluminum oxide, or silicate. The inorganic filler may be contained in an amount of 0.01 to 0.5 parts by weight based on 100 parts by weight of the base polymer powder.

Further, the surface crosslinking solution may further comprise a thickener. If the surface of the base polymer powder is further crosslinked in the presence of the thickener, it is possible to minimize the deterioration of the physical properties even after the pulverization. Specifically, as the thickener, at least one selected from a polysaccharide and a hydroxy-containing polymer may be used. The polysaccharide may be a gum type thickener, a cellulose type thickener and the like. Specific examples of the gum type thickener include xanthan gum, arabic gum, karaya gum, tragacanth gum, ghatti gum, guar gum, locust bean gum, and psyllium seed gum. Specific examples of the cellulose type thickener include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, and methylhydroxypropyl cellulose. Meanwhile, specific examples of the hydroxy-containing polymer include polyethylene glycol, polyvinyl alcohol and the like.

Meanwhile, in order to perform the surface crosslinking, a method of placing the surface crosslinking solution and the base polymer into a reaction tank and mixing them, a method of spraying a surface crosslinking solution onto the base polymer, a method in which the base polymer and the surface crosslinking solution are continuously supplied in a continuously operating mixer and mixed, or the like can be used.

In addition, the surface crosslinking may be carried out at a temperature of 100 to 250° C., and may be continuously performed after the drying and pulverizing step proceeding at a relatively high temperature. At this time, the surface crosslinking reaction may be carried out for 1 to 120 minutes, or 1 to 100 minutes, or 10 to 60 minutes. That is, in order to prevent a reduction in physical properties due to damages of the polymer particles by excessive reaction while inducing the minimal surface crosslinking reaction, the surface modification step may be performed under the above-described conditions.

Super Absorbent Resin

The super absorbent polymer produced by the preparation method of the present invention as described above has excellent dryness while maintaining excellent absorption performance.

Specifically, the super absorbent polymer according to the present invention has a centrifuge retention capacity (CRC) for a physiological saline solution (0.9 wt % sodium chloride aqueous solution) for 30 minutes of 30 g/g or more. The measurement method of the centrifuge retention capacity will be more specified in the following embodiments. Preferably, the centrifuge retention capacity is 30.5 g/g or more, or 31 g/g or more. In addition, the higher the value of the centrifuge retention capacity is, the more excellent it is. Thus, the substantial upper limit is not restricted, but as an example, it is 35 g/g or less, 34 g/g or less, or 33 g/g or less.

Further, the super absorbent polymer according to the present invention has a 6-hour dryness of 1.0 g or less. The 6-hour dryness refers to the amount of moisture present on the surface when 6 hours lapse after 2 g of the super absorbent polymer absorbs and swells a moisture and the like. The concrete measurement method thereof will be further specified in the following embodiments. Preferably, the 6-hour dryness is 0.9 g or less, 0.8 g or less, or 0.7 or less. The smaller the value of the dryness is, the more excellent it is. Thus, the lower limit of the 6-hour dryness is theoretically 0 g, but as an example, it is 0.1 g or more, or 0.2 g or more.

Further, the super absorbent polymer according to the present invention has an absorption rate (vortex) of 35 seconds or less as measured according to the measurement method of Vortex. The absorption rate refers to the time during which the vortex of the liquid disappears due to fast absorption when the super absorbent polymer is added to a physiological saline solution and stirred. This can define a fast absorption rate of the super absorbent polymer. The measurement method thereof will be more specified in the following embodiments. Preferably, the absorption rate is 34 seconds or less, or 33 seconds or less as measured according to the measurement method of Vortex. In addition, the smaller the value of the absorption rate is, the more excellent it is. Thus, the lower limit of the absorption rate is theoretically 0 seconds, but as an example, it is 10 seconds or more, 20 seconds or more, or 25 seconds or more.

Further, preferably, the super absorbent polymer according to the present invention has an absorbency under pressure (0.9 AUP) at 0.9 psi for a physiological saline solution (0.9 wt % sodium chloride aqueous solution) for 1 hour of 7 g/g or more. The measurement method of the absorbency under pressure will be more specified in the following embodiments. Preferably, the 0.9 AUP is 7.5 g/g or more, or 8.0 g/g or more. In addition, the higher the value of the absorbency under pressure it, the more excellent it is. Thus, the substantial upper limit is not restricted, but as an example, it is 25 g/g or less, 24 g/g or less, or 23 g/g or less.

Further, preferably, the super absorbent polymer according to the present invention has a liquid permeability of 5 seconds or more. The method for measuring the liquid permeability will be more specified in the following embodiments. Preferably, the liquid permeability is 6 seconds or more, 7 seconds or more, or 8 seconds or more. In addition, the higher the value of the liquid permeability is, the more excellent it is. Thus, the substantial upper limit is not restricted, but as an example, it is 25 seconds or less, or 20 seconds or less.

In addition, in the super absorbent polymer according to the present invention, the ratio of particles having a particle diameter of 150 to 850 μm is 90% or more.

Advantageous Effects

As described above, the super absorbent polymer according to the present invention has excellent dryness while maintaining excellent absorption performance, and thus is preferably used for hygienic materials such as diapers and can exhibit excellent performance.

DETAILED DESCRIPTION OF THE EMBODIMENTS

Hereinafter, preferred examples are provided for better understanding of the invention. However, these Examples are given for illustrative purposes only and are not intended to limit the scope of the present invention thereto.

Example 1

100 g of acrylic acid, 0.35 g of polyethylene glycol diacrylate (PEGDA, Mw=523) as a crosslinking agent, 0.05 g of sodium persulfate (SPS) as a thermal initiator, 0.06 g of sodium bicarbonate (SBC) as a foaming agent, 0.02 g of sodium dodecylsulfate as a surfactant, 83.3 g of 50% caustic soda (NaOH) and 89.8 g of water were mixed to prepare a monomer aqueous solution composition. The monomer aqueous solution composition was subjected to a thermal polymerization reaction to obtain a polymerized sheet. The polymerized sheet was taken out and cut into a size of 3 cm×3 cm. Then, the cut sheet was subjected to a chopping process using a meat chopper to prepare crumbs. Then, the crumbs were dried in an oven capable of shifting airflow up and down. The crumbs were uniformly dried by flowing hot air at 185° C. from the bottom to the top for 15 minutes and from the top to the bottom for 15 minutes, so that the dried product had a water content of 2% or less. After drying, the crumbs were pulverized using a pulverizer and then classified with an amplitude of 1.5 mm into three mesh sizes (combination of classified meshes: #30/#50/#100). The respective classified particles (10%/72%/18%) were collected, and a polymer having a particle size of about 150 μm to 850 μm was classified and obtained. The base polymer powder was obtained by the above method.

Subsequently, to 100 parts by weight of the base polymer prepared, a surface crosslinking solution (4 parts by weight of water, 0.25 parts by weight of ethyleneglycol diglycidyl ether (EX-810), 0.3 parts by weight of propylene glycol (PG), 0.15 parts by weight of aluminum sulfate 18 hydrate, and 0.1 part by weight of silica (Aerosil A200)) was uniformly mixed, and then subjected to a surface crosslinking reaction at 140° C. for 30 minutes. After completion of the surface treatment, the resultant product was sieved to obtain a super absorbent polymer having a particle diameter of 150 to 850 μm.

Examples 2 to 9 and Comparative Examples 1 to 5

A super absorbent polymer was obtained in the same manner as in Example 1, except that SPS, and the composition of the surface crosslinking solution were set as shown in Table 1 below.

Experimental Example: Evaluation of Physical Properties of Super Absorbent Polymer The physical properties of the super absorbent polymer prepared in Examples and Comparative Examples were evaluated by the following methods.

(1) Extractable Contents (16 hr E/C)

The extractable contents were measured for the base polymer in the preparation process of Examples and Comparative Examples by the same method as described in EDANA (European Disposables and Nonwovens Association) recommended test method No. WSP 270.2.

Specifically, 1.0 g of the base polymer was put in 200 g of a 0.9 wt % NaCl solution, and then swollen for 16 hours while stirring at 500 rpm. The aqueous solution was filtered out through a filter paper. The filtered solution was primarily titrated to pH 10.0 with 0.1 N caustic soda solution, and then back-titrated to pH 2.7 with a 0.1 N hydrogen chloride solution. From the amount required during neutralization, the uncrosslinked polymer substance was calculated and measured as the extractable content.

(2) Centrifuge Retention Capacity (CRC)

The centrifuge retention capacity (CRC) by water absorption capacity under a non-loading condition was measured for the super absorbent polymers of Examples and Comparative Examples in accordance with EDANA (European Disposables and Nonwovens Association) recommended test method No. WSP 241.3.

Specifically, $W_0$ (g, about 0.2 g) of the super absorbent polymers of Examples and Comparative Examples were uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2$ (g) of the bag was then measured. Further, the same procedure was carried out without using the super absorbent polymer, and then the resultant weight $W_1$ (g) was measured.

Using the respective weights thus obtained, CRC (g/g) was calculated according to the following Mathematical Formula 1.

$$CRC\ (g/g) = \{[W_2\ (g) - W_1\ (g) - W_0\ (g)]/W_0\ (g)\}$$ [Mathematical Formula 1]

in Mathematical Formula 1, $W_0$ (g) is an initial weight (g) of the super absorbent polymer, $W_1$ (g) is the weight of the device not including the super absorbent polymer, measured after immersing and absorbing the same into a physiological saline solution for 30 minutes and then dehydrating the same by using a centrifuge at 250 G for 3 minutes, and $W_2$ (g) is the weight of the device including the super absorbent polymer, measured after immersing and absorbing the super absorbent polymer into a physiological saline solution at room temperature for 30 minutes and then dehydrating the same by using a centrifuge at 250 G for 3 minutes.

In addition, with respect to the respective base polymers produced in the preparation process of Examples and Comparative Examples, CRC (BR CRC) was measured in the same manner as described above.

(3) Dryness 2 g of the super absorbent polymer was put in a 500 mL beaker and 200 mL of distilled water at 22 to 24° C. was added thereto. After the super absorbent polymer was swollen, it was taken out and left at room temperature for 6 hours. Subsequently, after stacking five filter papers with a diameter of 5 cm, the filter paper was placed on the super absorbent polymer, and pressurized at 0.2 psi for 1 minute. The weight (dryness, g) of the distilled water absorbed by the filter pater was measured.

(4) Absorption Rate (Vortex)

50 mL of a 0.9 wt % NaCl solution was put in a 100 mL beaker, and then 2 g of each super absorbent polymer prepared in Examples and Comparative Examples was added thereto while stirring at 600 rpm using a stirrer. Then, the vortex time was calculated by measuring the amount of time until a vortex of the liquid caused by the stirring disappeared and a smooth surface was formed, and the result was shown as the vortex removal time.

50 mL of a 0.9 wt % NaCl solution was put in a 100 mL beaker, to which a magnetic bar with a size of 30 mm (polygon type with a length of 30 mm and a thickness of 8 mm) was added. While stirring at 600 rpm using a magnetic stirrer, 2.0 g of the super absorbent polymers prepared in Examples and Comparative Examples were respectively added. Then, the vortex time was calculated by measuring the amount of time until a vortex of the liquid caused by the stirring disappeared and a smooth surface was formed, and the result was shown as the vortex removal time (absorption rate; vortex).

(5) Absorbency Under Pressure (AUP)

The absorbency under pressure (AUP) of the super absorbent polymers of Examples and Comparative Examples was measured in accordance with EDANA (European Disposables and Nonwovens Association) recommended test method No. WSP 242.3.

Specifically, a 400 mesh stainless screen was installed at the bottom of a plastic cylinder having an inner diameter of 60 mm. $W_0$ (g, about 0.90 g) of the super absorbent polymers obtained in Examples and Comparative Examples were uniformly scattered on the stainless screen under a condition of a temperature of 23±2° C. of and a relative humidity of 45%. Then, a piston capable of providing a load of 0.9 psi uniformly was designed so that the outer diameter was slightly smaller than 60 mm and thus it could move freely up and down without any gap with the inner wall of the cylinder. At this time, the weight $W_3$ (g) of the device was measured.

A glass filter having a diameter of 125 mm and a thickness of 5 mm was placed in a Petri dish having a diameter of 150 mm, and a physiological saline solution composed of 0.90 wt % sodium hydroxide aqueous solution was poured until the surface level became equal to the upper surface of the glass filter. Then, a sheet of filter paper having a diameter of 120 mm was placed on the glass filter. The measuring device was placed on the filter paper, so that the liquid was absorbed under load for one hour. After one hour, the measuring device was lifted and the weight $W_4$ (g) was measured.

Using the respective weights thus obtained, AUP (g/g) was calculated according to the following [Mathematical Formula 2.

$$AUP\ (g/g) = [W_4\ (g) - W_3\ (g)]/W_0\ (g)$$ [Mathematical Formula 2]

in Mathematical Formula 2, $W_0$ (g) is an initial weight (g) of the super absorbent polymer, $W_3$ (g) is the total sum of a weight of the super absorbent polymer and a weight of the device capable of providing a load to the super absorbent polymer, and $W_4$ (g) is the total sum of a weight of the super absorbent polymer and a weight of the device capable of providing a load to the super absorbent polymer, after absorbing a physiological saline solution to the super absorbent polymer under a load (0.9 psi) for 1 hour.

(6) Liquid Permeability

In a state where a piston was introduced in a chromatography tube (F20 mm), the liquid surface was displayed as a 20 ml mark line and a 40 ml mark line. Then, water was inversely introduced in a chromatography tube so that bubbles are not generated between a glass filter and a cork at the bottom of the chromatography tube, filling the tube for approximately 10 ml, and the chromatography tube was washed 2 to 3 times with salt water and filled with 0.9% salt water up to 40 ml or greater. A piston was introduced in the chromatography tube, a valve at the bottom was opened, and then the time (B) taken for the liquid surface decreasing from a 40 ml mark line to a 20 ml mark line was recorded.

10 mL of salt water was left in the chromatography tube, to which 0.2±0.0005 g of classified (30 # to 50 #) sample was added. Salt water was added thereto so that the salt water volume became 50 ml, and then the result was left for 30 minutes. After that, a piston with a weight (0.3 psi=106.26 g) was introduced in the chromatography tube, and the result was left for 1 minute. After opening a valve at the bottom of the chromatography tube, the time (T1) taken for the liquid surface decreasing from a 40 ml mark line to a 20 ml mark line was recorded. Thereby, the liquid permeability (time of T1–B) was measured.

The results of the above measurement are shown in Table 1 below.

use amount of the thermal initiator (SPS) was large and thus the dryness was decreased. In addition, in the case of Comparative Example 5, since propylene glycol as a surface crosslinking agent was not used, the dryness or liquid permeability was relatively lowered as compared with those of Examples.

The invention claimed is:

1. A method for producing a super absorbent polymer comprising the steps of:
    crosslinking acrylic acid monomer having at least partially neutralized acidic groups in the presence of an internal crosslinking agent and a thermal polymerization initiator to form a hydrogel polymer;
    drying, pulverizing and classifying the hydrogel polymer to form a base polymer powder; and
    heat-treating and surface-crosslinking the base polymer powder in the presence of a surface crosslinking solution to form a super absorbent polymer,
    wherein the thermal polymerization initiator is used in an amount of 0.05 to 0.15 parts by weight based on 100 parts by weight of the acrylic acid,
    wherein the surface crosslinking solution comprises ethyleneglycol diglycidyl ether and propylene glycol in a weight ratio of 1:1.2 to 1:2.4, and the total amount of ethyleneglycol diglycidyl ether and propylene glycol

TABLE 1

| Unit | Composition of surface crosslinking agent | | | | Physical properties of base polymer | | Physical properties of super absorbent polymer | | | | |
|---|---|---|---|---|---|---|---|---|---|---|---|
| | SPS ppmw | Water phr | EX-810 phr | PG phr | BR CRC g/g | 16 hr EC wt % | CRC g/g | Dryness g | Vortex sec | AUL g/g | Liquid permeability sec |
| Ex. 1 | 500 | 4 | 0.25 | 0.3 | 34.0 | 8.1 | 31.1 | 0.4 | 31 | 8.4 | 7 |
| Ex. 2 | 500 | 4 | 0.25 | 0.6 | 34.0 | 8.1 | 30.7 | 0.3 | 32 | 9.1 | 8 |
| Ex. 3 | 1000 | 4 | 0.25 | 0.3 | 35.1 | 10.7 | 32.3 | 0.4 | 33 | 7.2 | 8 |
| Ex. 4 | 1000 | 4 | 0.25 | 0.6 | 35.1 | 10.7 | 32.0 | 0.3 | 30 | 8.1 | 8 |
| Ex. 5 | 1500 | 4 | 0.25 | 0.3 | 34.9 | 11.6 | 31.8 | 0.4 | 31 | 9.7 | 11 |
| Ex. 6 | 1500 | 4 | 0.25 | 0.6 | 34.9 | 11.6 | 31.5 | 0.2 | 30 | 10.7 | 10 |
| Ex. 7 | 1500 | 4 | 0.25 | 1.0 | 34.9 | 11.6 | 30.2 | 0.5 | 33 | 13.1 | 16 |
| Ex. 8 | 2000 | 4 | 0.25 | 0.3 | 34.8 | 12.5 | 31.9 | 0.7 | 30 | 9.1 | 14 |
| Ex. 9 | 2000 | 4 | 0.25 | 0.6 | 34.8 | 12.5 | 31.4 | 0.6 | 32 | 9.6 | 16 |
| Comparative Ex. 1 | 1500 | 4 | 0 | 0.25 | 34.9 | 11.6 | 35.5 | 3.0 | 31 | 6.5 | 0.7 |
| Comparative Ex. 2 | 1500 | 4 | 0.25 | 2.0 | 34.9 | 11.6 | 29.0 | 2.7 | 31 | 14.9 | 23 |
| Comparative Ex. 3 | 2500 | 4 | 0.25 | 0.6 | 34.3 | 15.5 | 33.2 | 2.5 | 35 | 7.1 | 4 |
| Comparative Ex. 4 | 3000 | 4 | 0.25 | 0.6 | 34.5 | 19.2 | 34.2 | 2.6 | 37 | 8.6 | 8 |
| Comparative Ex. 5 | 1500 | 4 | 0.25 | 0 | 34.9 | 11.6 | 31.4 | 0.6 | 30 | 10.0 | 9 |

From the results of Table 1, it was confirmed that the super absorbent polymers of Examples according to the present invention had excellent dryness while maintaining other physical properties equal to or higher than those of the super absorbent polymers of Comparative Examples.

On the other hand, in the case of Comparative Examples, it was confirmed that various physical properties were deteriorated according to the use amount of the thermal initiator or the composition of the surface crosslinking agent. Specifically, in the case of Comparative Examples 1 and 2, since the use amount of propylene glycol as a surface crosslinking agent was small or large, the dryness was decreased. In the case of Comparative Examples 3 and 4, the ranges from 0.55 to less than 1 part by weight based on 100 parts by weight of the base polymer,
wherein a dryness of the superabsorbent polymer ranges from 0.2 grams to 0.4 grams, the dryness being measured by swelling 2 grams of the superabsorbent polymer in 200 milliliters of water at a temperature of 22° C. to 24° C., removing the swollen superabsorbent polymer from the water and maintaining the swollen superabsorbent polymer at room temperature for 6 hours, pressuring a stack of five filter papers having a diameter of 5 centimeters at 0.2 psi for 1 minute against the swollen superabsorbent polymer, and determining the dryness from the weight of water absorbed by the filter paper, and wherein the superabsorbent polymer has a centrifugation retention capacity (CRC) of 30.7 g/g or more, and an absorbency under pressure (AUP) of 7.2 g/g to 10.7 g/g.

2. The method of claim 1, wherein the thermal polymerization initiator is sodium persulfate, potassium persulfate, ammonium persulfate, 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, or 4,4-azobis-(4-cyanovaleric acid).

3. The method of claim 1, wherein the surface crosslinking solution further comprises aluminum sulfate, or an inorganic filler.

4. The method of claim 1, wherein the super absorbent polymer has an absorption rate (vortex) of 35 seconds or less, as measured according to the measurement method of Vortex.

5. The method of claim 1, wherein a liquid permeability of the superabsorbent polymer ranges from 7 seconds to 11 seconds, the liquid permeability being measured by filling a chromatography tube having a glass filter and a valve at one end thereof with a 0.9% salt water, introducing a piston into the chromatography tube, opening the valve, and measuring a time (B) needed for the piston to reduce the level of the salt water from the 40 mL mark to the 20 mL mark of the chromatography tube, and then in a separate measurement, introducing 0.2±0.0005 grams of a sample of the superabsorbent polymer, the sample having been classified by a mesh ranging from #30 to #50, filling the chromatography tube having the classified sample, the glass filter and the valve at one end thereof with a 0.9% salt water, introducing the piston into the chromatography tube, opening the valve, and measuring a time (T1) needed for the piston to reduce the level of the salt water from the 40 mL mark to the 20 mL mark of the chromatography tube, and determining the liquid permeability as the difference of T1−B.

6. The method of claim 1, wherein the surface crosslinking solution further comprises aluminum sulfate and an inorganic filler.

* * * * *